(12) United States Patent
Johnson (10) Patent No.: US 9,759,924 B2
(45) Date of Patent: Sep. 12, 2017

(54) FLAT PROFILE LASER BEAM SHAPER

(71) Applicant: Fermi Research Alliance, LLC, Batavia, IL (US)

(72) Inventor: Todd R. Johnson, Aurora, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 87 days.

(21) Appl. No.: 14/675,977

(22) Filed: Apr. 1, 2015

(65) Prior Publication Data
US 2015/0277128 A1 Oct. 1, 2015

Related U.S. Application Data

(60) Provisional application No. 61/973,355, filed on Apr. 1, 2014.

(51) Int. Cl.
*G02B 27/09* (2006.01)
*G02B 27/28* (2006.01)

(52) U.S. Cl.
CPC ..... *G02B 27/0905* (2013.01); *G02B 27/0927* (2013.01); *G02B 27/283* (2013.01)

(58) Field of Classification Search
None
See application file for complete search history.

(56) References Cited

U.S. PATENT DOCUMENTS

| | | |
|---|---|---|
| 4,061,985 A | 12/1977 | Siebert |
| 4,174,150 A | 11/1979 | Congleton |
| 4,655,547 A | 4/1987 | Heritage et al. |
| 5,095,487 A | 3/1992 | Meyerhofer et al. |
| 5,166,818 A | 11/1992 | Chase et al. |
| 6,310,715 B1 | 10/2001 | Moore |
| 6,891,674 B2* | 5/2005 | Damask ............... G02B 6/278 359/256 |
| 2006/0256335 A1* | 11/2006 | Chen .................. G02B 5/3083 356/369 |
| 2007/0014008 A1 | 1/2007 | Kennedy |
| 2012/0012758 A1* | 1/2012 | Kajikawa ........... B23K 26/0057 250/492.1 |

OTHER PUBLICATIONS

Agostinelli, J. et al., "Optical pulse shaping with a grating pair," Applied Optics (1979) 18(14):2500-2504.
Beam flattening of a 1083nm beam, http://laser.physics.sunysb.edu/~jose/flatbeam.html, Oct. 2003, 2 pages.

(Continued)

*Primary Examiner* — Derek S Chapel
(74) *Attorney, Agent, or Firm* — Kevin Soules; Luis M. Ortiz; Kermit D. Lopez (57) ABSTRACT

A system for shaping a beam comprises an emitter for emitting coherent electromagnetic radiation. Birefringent displacers are configured between the emitter and a target wherein the at least two birefringent displacers split the coherent electromagnetic radiation into a plurality of coherent parallel beams of electromagnetic radiation thereby producing a shaped wave front of the coherent parallel beams of electromagnetic radiation.

18 Claims, 7 Drawing Sheets

(56) References Cited

OTHER PUBLICATIONS

Tomizawa, H., "Review of Advanced Laser Technologies for Photocathode High-Brightness Guns," JASRI/Spring-8. Viewable at: http://accelconf.web.cern.ch/accelconf/LINAC08/talks/fr104_talk.pdf, 74 pages.

Zhou, S., "Efficient temporal shaping of ultrashort pulses with birefringent crystals," Applied Optics (2007) 46(35):8488-8492.

"Development, installation and maintenance of lasers for particle accelerators;" Ingo Will et al. Viewable at: http://www.mbi-berlin.de/de/research/projects/4.1/topics/T1/index.htm, 6 pages.

\* cited by examiner

FLAT PROFILE LASER BEAM SHAPER

CROSS REFERENCE TO RELATED PATENT APPLICATIONS

This patent application claims the priority and benefit of U.S. provisional patent application 61/973,355, entitled "Flat Profile Laser Beam Shaper", filed on Apr. 1, 2014. This patent application therefore claims priority to U.S. Provisional Patent Application Ser. No. 61/973,355, which is incorporated herein by reference in its entirety.

STATEMENT OF GOVERNMENT RIGHTS

The invention disclosed in this application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention is generally related to methods, systems, and apparatuses for shaping the intensity profile of electromagnetic radiation beams.

BACKGROUND

There are numerous applications that require a laser beam to have a flat, non-Gaussian transverse profile. Commercial devices exist which accomplish a "top hat" transformation of a Gaussian beam. However, these are extremely sensitive to misalignment, divergence, and other input beam parameters. The output is also subject to diffraction effects, which degrade the flat profile.

Prior art methods and systems use refractive beam shapers. However, the prior art methods and systems are very sensitive to beam alignment, size, and divergence. Additionally, the prior art approaches inherently suffer from diffraction effects which cause the profile to change significantly in less than 0.5 meters. Wavelength can influence the diffraction rate suffered by the beam over the values for visible wavelengths. Under these conditions the useable range of prior art methods and systems is limited.

Therefore, there is a need in the art for a laser beam shaper that does not rely on ordinary refractive lenses and instead uses a series of birefringent crystal elements to produce a desired intensity profile.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for beam shaping.

It is another aspect of the disclosed embodiments to provide a method and system for shaping coherent electromagnetic radiation.

It is yet another aspect of the disclosed embodiments to provide an enhanced method and system for shaping a laser beam using birefringent displacers.

It is another aspect of the disclosed embodiments to provide a method, system, and apparatus for converting a monochromatic beam of light having a symmetrical Gaussian transverse intensity profile into one which has a flat "top hat" intensity profile in one axis. Other intensity profiles are also possible with simple adjustments of the various components.

The aforementioned aspects and other objectives and advantages can now be achieved as described herein. A method and system for shaping a beam comprises an emitter for emitting coherent electromagnetic radiation. Birefringent displacers are configured between the emitter and a target wherein the at least two birefringent displacers split the coherent electromagnetic radiation into a plurality of coherent parallel beams of electromagnetic radiation thereby producing a shaped wave front of the coherent parallel beams of electromagnetic radiation.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
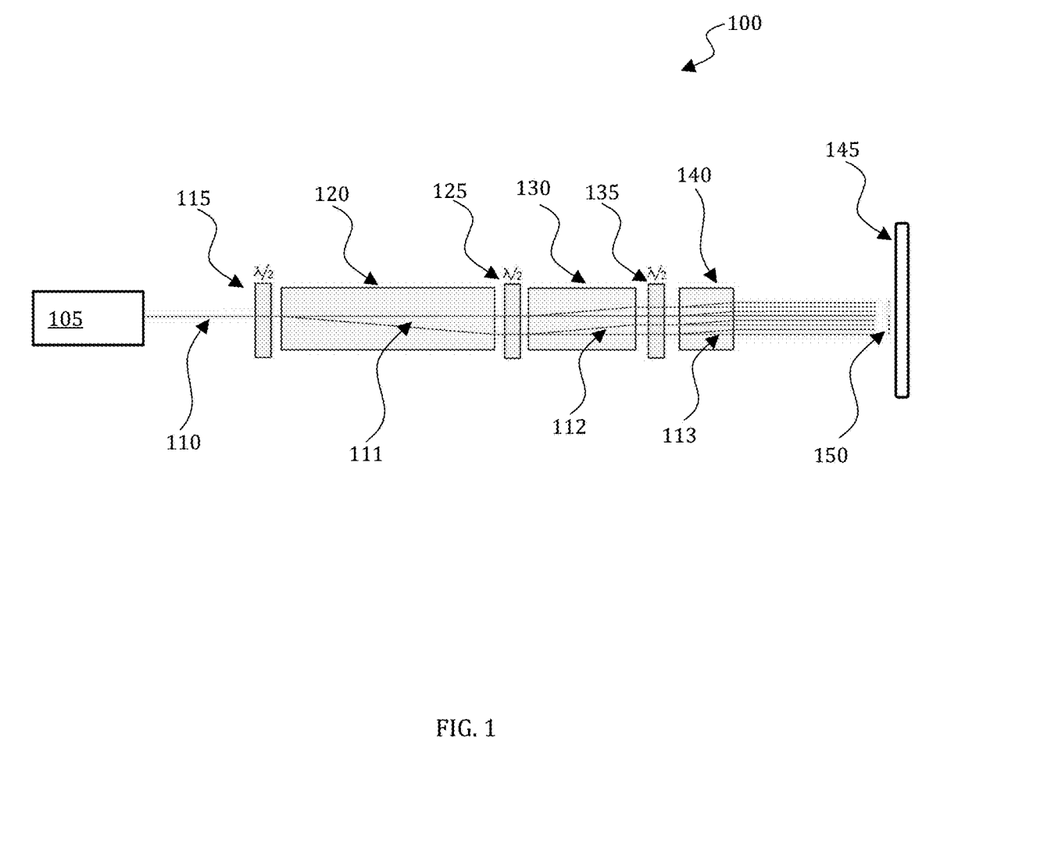
FIG. 1 depicts a block diagram of a system for shaping an intensity profile of electromagnetic radiation in accordance with the disclosed embodiments.

In one embodiment illustrated in FIG. 1, a system 100 comprises an emitter 105 used to shine a coherent beam of electromagnetic radiation 110 on a series of birefringent crystal elements 120, 130, and 140 (beam displacers) to shape the beam 110 into a desired intensity profile 150. Most commonly the emitter 105 is embodied as a laser or other similar emitting device. Lasers are characterized by the electromagnetic radiation they emit which is spatially coherent. This allows laser beams to be focused very tightly often at long distances. Lasers may also be temporally coherent, which gives them the ability to emit light over a very narrow spectrum.

The birefringent beam displacers 120, 130, and 140 are optical elements that are used to split an incoming beam such as beam 110 into two or more parallel, orthogonally polarized beams. Often birefringent beam displacers are crystalline optical elements. These crystals can be composed of materials such as, but not limited to, calcite, yttrium vanadate, or barium borate. The crystals can be cut with their optical axis approximately 45 degrees (or at another desired angle) from the beam propagation axis of the crystal.

Electromagnetic radiation that is polarized perpendicularly to the optical axis of the beam displacer is transmitted through the beam displacer without displacement. Electromagnetic radiation that is polarized along the plane of the optical axis of the beam displacer is displaced from the original beam path. The displacement is a function of the refractive index of the birefringent device and the thickness of the beam displacer.

The birefringent beam displacers 120, 130, and 140 are separated by a fixed distance. The distance may be primarily determined by the clearance and mounting requirements of the intervening wave plates 115, 125, and 135. Other factors may also contribute to the separation distance such as the properties of the beam displacers 120, 130, and 140.

It should be appreciated that, while the exemplary system 100 illustrated in FIG. 1 includes three beam displacers, any number of similar beam displacing elements may also be used. The length of the beam displacer elements can be decreased in binary progression, (i.e. 1, 0.5, 0.25, etc.).

A wave plate such as ½ wave plates 115, 125, and 135 can be placed in front of each beam displacer 120, 130, and 140, respectively, The wave plates 115, 125, and 135 are used to rotate the incoming orthogonally polarized beams 110. In the example illustrated in FIG. 1, the beams 100 are rotated by 45 degrees. This allows the following beam displacer to split the beams equally. In other embodiments, the wave plates may be used to rotate the beams by other amounts in order to create different intensity profile shapes 150.

In other embodiments, the intensity distribution of the beam 110 can be controlled by varying the wave plate configuration to create overlapping beamlets that add to produce a desired profile shape. A half, quarter, or other desired wave plate in front of each displacer crystal can be used to rotate the S and P polarized beams emerging from the previous stage to, for example, +45 or −45 degrees (or R and L circular) polarization allowing the following stage to decompose each incoming beam into two parts. The final intensity profile can be modified by rotating each wave plate and therefore altering the split ratios at the corresponding stage.

In one embodiment, the input electromagnetic beam can be a Gaussian input beam. In this example the Gaussian input beam propagates through the first wave plate 115 and birefringent beam displacer 120. It is divided into 2 parallel beamlets 111. The two beamlets 111 then propagate through the second wave plate 125 and birefringent beam displacer 130 where they are divided into 4 parallel beamlets 112. The beamlets 112 then propagate through wave plate 135 and birefringent beam displacer 140 where they are divided into 8 parallel beamlets 113. The 8 parallel beamlets 113 thus form the intensity profile 150 that is incident on the target 145. As illustrated in FIG. 1, three stages of beam displacers and wave plates can be used, but any number of wave plate and beam displacer stages is possible.

Also note that each displacer 120, 130, and 140 may be oriented so as to deliver the displaced beamlet(s) 111, 112, and 113 in the same direction of offset as the other stages, or the opposite direction (as shown by the orientation of displacer 120 in FIG. 1). In this embodiment, the input beam is then approximately centered with respect to the output beam. Orienting all displacers identically yields an output beam with one end of the profile being centered on the path of the input beam. It should be appreciated that the configuration of the displacers may not necessarily be in order of decreasing length. However, the shortest displacer must be last to maintain alternating polarization of adjacent beamlets.

The intensity profile 150 can be a "rooftop" type profile, which is extended and flat in one axis and remains unchanged in the other axis. In other embodiments, a profile can comprise the central 50% of its extent at a greater or lesser intensity than the adjacent ends of the profile, or a stair step profile which increases (or decreases) approaching the center and then reaches the original intensity at the other end.

Input alignment of the beams 110 and the optical elements are noncritical in creating the desired profile because the output is a sum of the Gaussian beamlets. This also allows for diffractive degradation in the far field to be minimized. The flat or rooftop beam profile that results from the system 100 illustrated in FIG. 1 can propagate for a long distance (on the order of a meter) without changing shape.

Figure 2:
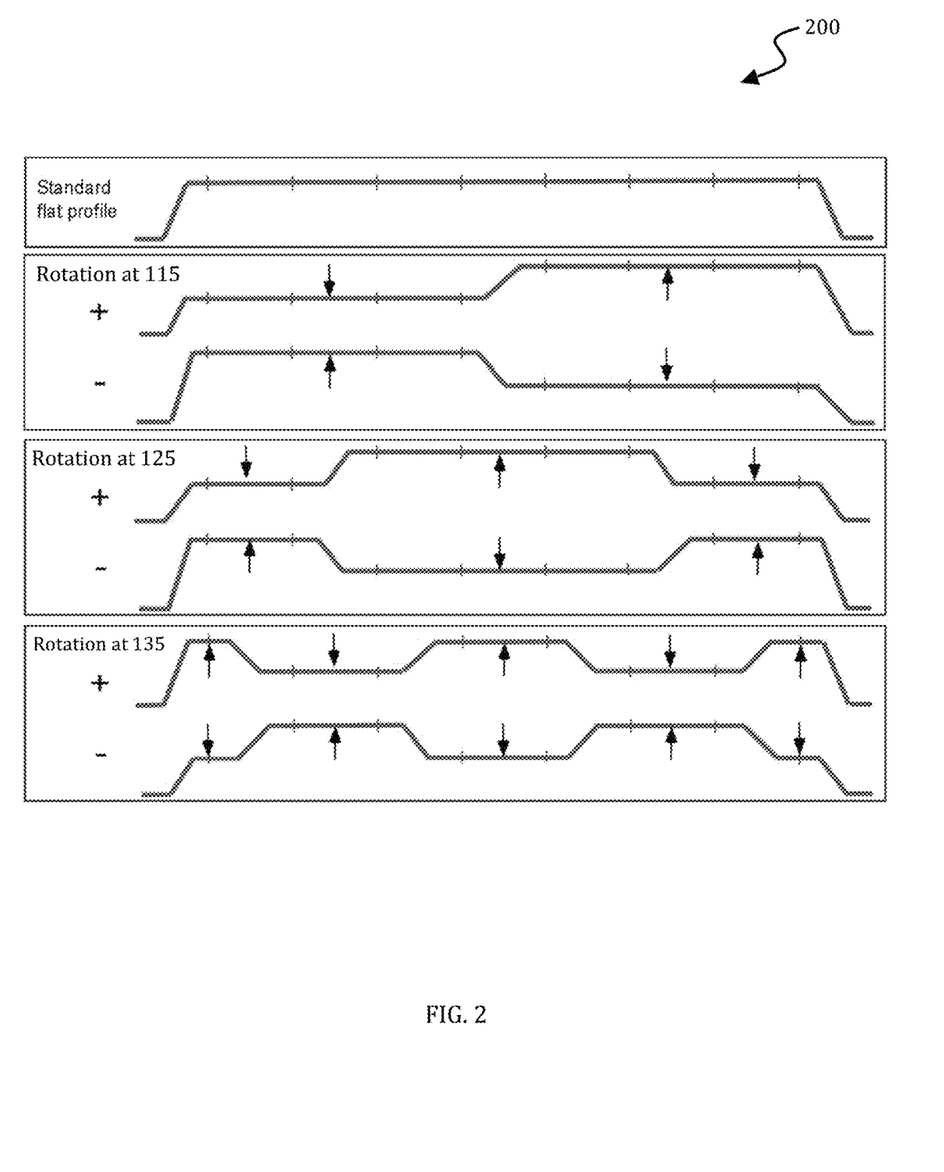
FIG. 2 depicts a graphical representation of intensity variations in accordance with the disclosed embodiments.

FIG. 2 illustrates intensity variations 200 at the 50% point for each stage of wave plates 115, 125, and 135. It should be appreciated that the wave plate stages shown can be adjusted to set the intensity of the affected profile segment(s) all the way to zero if desired.

Figure 3:
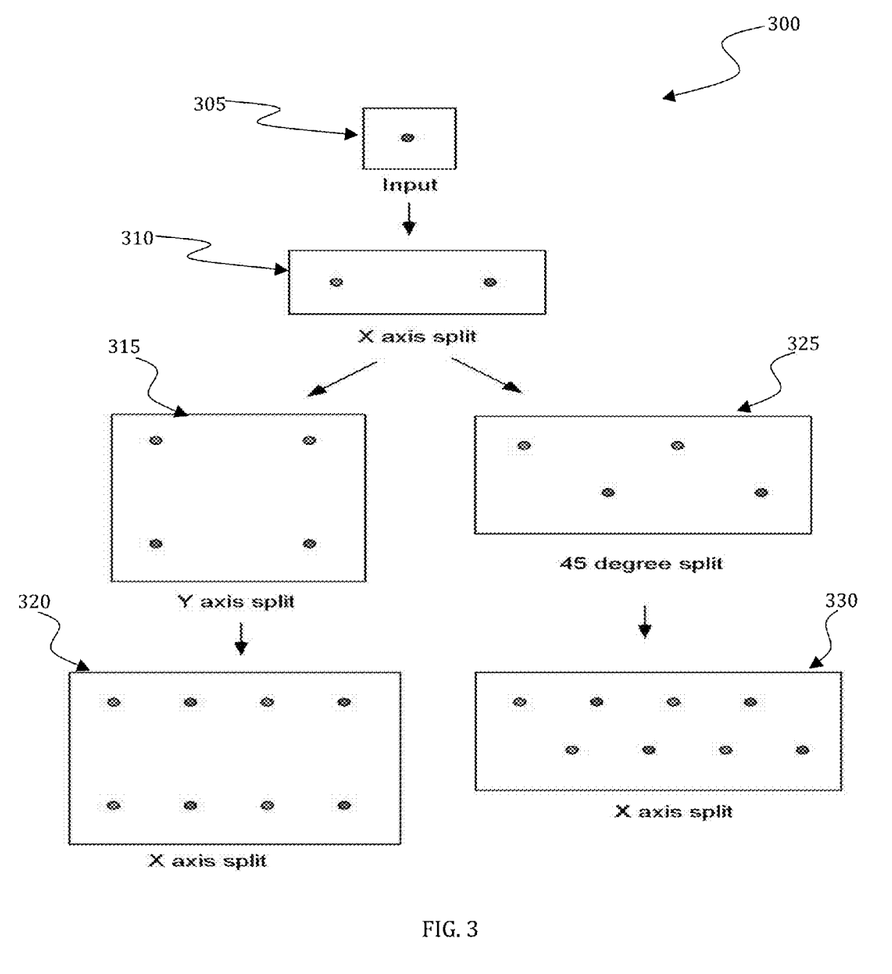
FIG. 3 depicts steps associated with a method of shaping the intensity profile of electromagnetic radiation, in accordance with an embodiment of the invention.

FIG. 3 illustrates a method 300 showing steps for two-dimensional shaping of an electromagnetic beam in accordance with the systems and methods described herein. In particular, the chart 300 illustrates steps for producing a beam shape other than a uniform rooftop shape. The two branches after block 310 show two different possible configurations for the stages after the first split that produce two different non-rooftop profiles.

In one embodiment, an input beam illustrated by block 305 is subject o an x-axis split via a wave plate and/or displacer stage at block 310. The x-axis split beams can then be split along the y-axis via another wave plate and/or displacer stage to create a rectangular beam profile. The rectangular beam profile at block 315 can then be further split along the x-axis via another wave plate and/or displacer stage to create an elongated rectangular beam profile as shown at block 320.

In another embodiment, the input beam illustrated by block 305 is subject to an x-axis split via a wave plate and/or displacer stage at block 310. A 45-degree split at block 325 can then be achieved by a wave plate and/or displacer stage to create a staggered beam profile as shown. When the staggered beam profile is further split along the x-axis via another wave plate and/or displacer stage, a tighter staggered beam profile can be created as shown at block 330.

As illustrated in FIG. 3, the systems and methods disclosed herein can produce non-flat profiles, if desired, by adjusting the wave plates to alter the split ratios at each stage. More than one stage may be adjusted at a time to produce more complex profiles. The stacking principle can be applied to 2-axis patterns as well, although because of the way the split beams are polarized in a 2D configuration, special attention is required to account for interference effects. Arranging some splits at 45 degrees will allow adjacent beamlets to still be orthogonally polarized. It should be understood that the two exemplary embodiments illustrated in FIG. 3 are not meant to be limiting and are provided to illustrate that any number of beam profiles can be created according to the methods and systems disclosed herein by altering the wave plates and displacers used in the optical path of the beam.

Figure 4A:
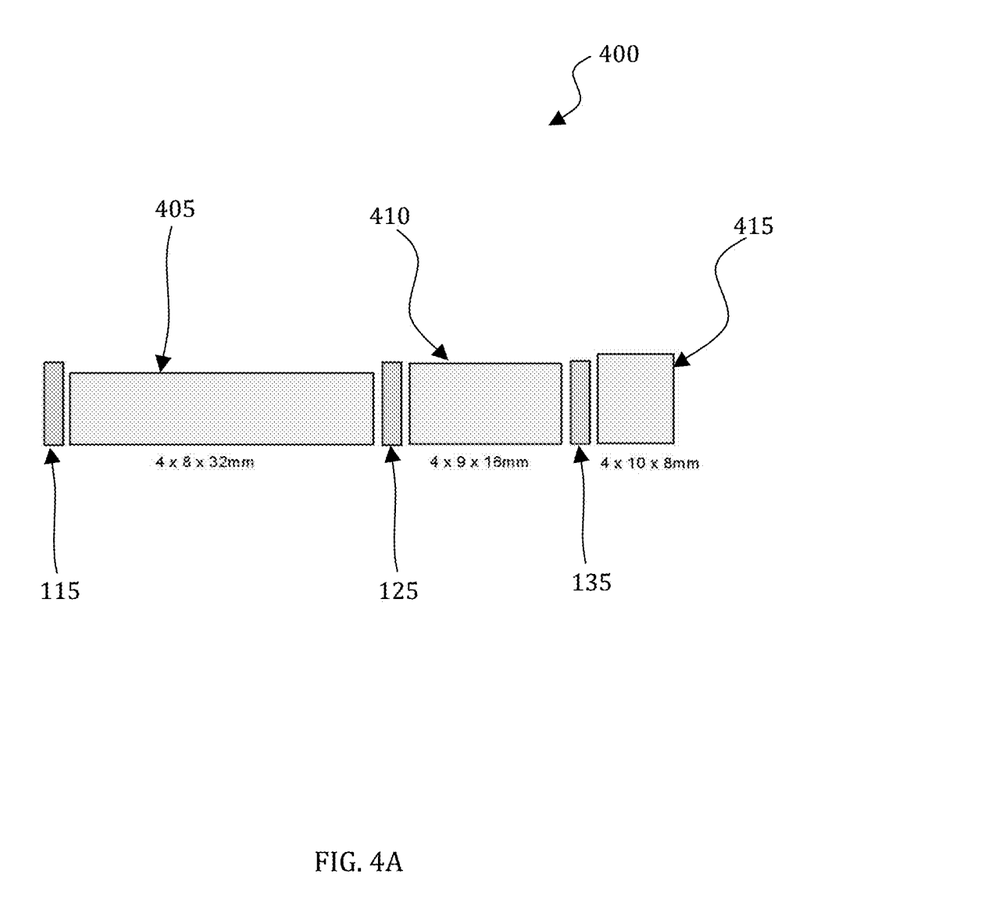
FIG. 4A depicts a block diagram of a system for shaping an intensity profile of electromagnetic radiation in accordance with another embodiment of the invention.
Figure 4B:
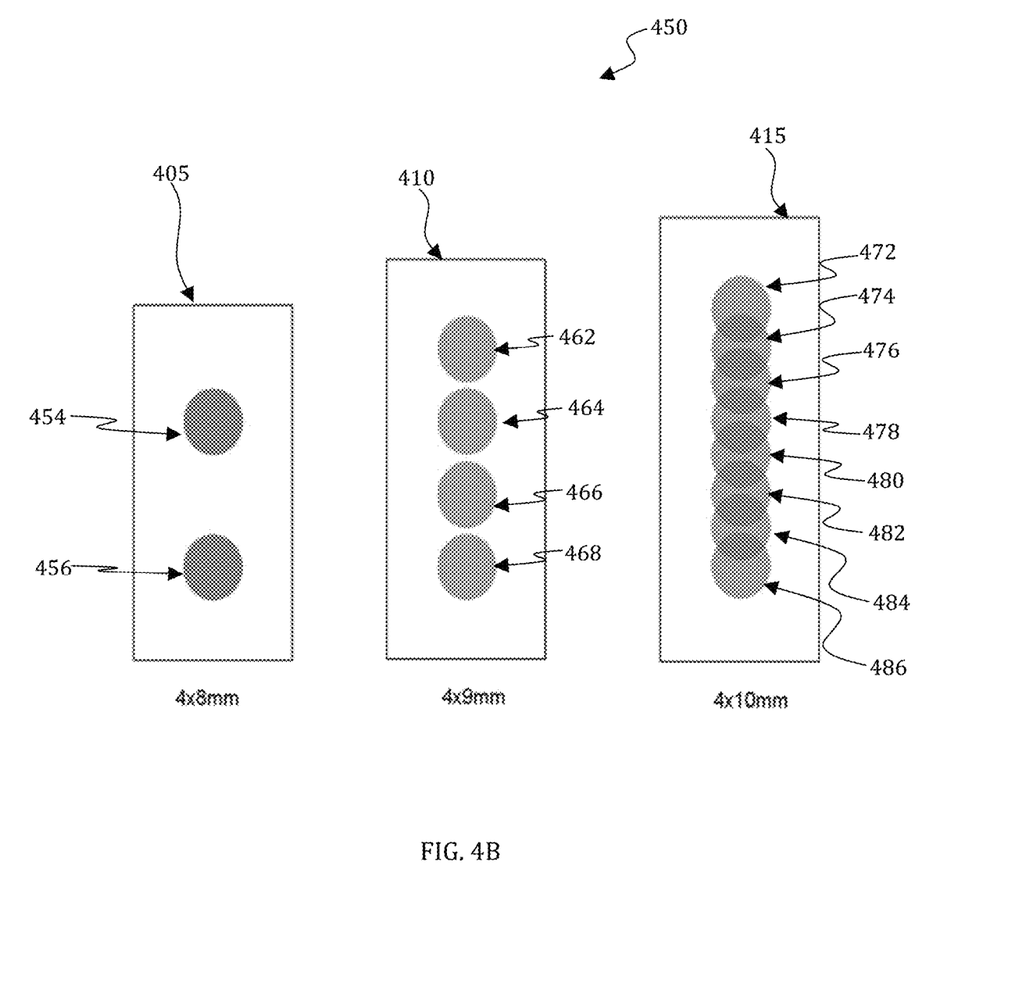
FIG. 4B depicts a diagram illustrating the output from various optical elements associated with a system for shaping an intensity profile of electromagnetic radiation in accordance with an embodiment of the invention.

FIG. 4B illustrates an exemplary propagation pattern 450 between stages of an exemplary beam stacker apparatus 400, illustrated in FIG. 4A, in accordance with the embodiments disclosed herein. In FIG. 4A, displacers 405, 410, and 415 are separated by wave plates 115, 125, and 135, respectively. As illustrated, displacer 405 is configured to be 4 by 8 by 32 millimeters, displacer 410 is configured to be 4 by 9 by 16 millimeters, and displacer 415 is configured to be 4 by 10 by 8 millimeters. It should be appreciated that while these, and other values, are provided herein, other sizes and shapes may be used depending on design considerations.

Electromagnetic radiation exiting displacer 405 is illustrated in FIG. 4B. Beam displacer 405 displaces the beam, such that beam 110 results in two beams, such as beam 111. Indeed, beam 111 is illustrated in cross-section by dots 454 and 456. Similarly, beam displacer 410 displaces beam(s) 111 such that beam 112 results. Beam 112 is illustrated in cross-section by dots 462, 464, 466, and 468. Likewise, beam displacer 415 displaces beam(s) 112 such that beam 113 results. Beam 113 is illustrated in cross-section by dots 472, 474, 476, 478, 480, 482, 484, and 486 Of particular importance is the pattern formed by cross-sections 472, 474, 476, 478, 480, 482, 484, and 486. This is the intensity profile. As these cross-sections overlap they begin to form a flat "roof top" profile. Additional beam displacers may optionally be included to further displace the beams and form the desired profile.

FIG. 4A further illustrates the preferred physical characteristics of displacers 405, 410, and 415. Specifically, beam displacer 405 is twice as long beam displacer 410, which is similarly twice as long as beam displacer 415. The beam displacer 405 is also one unit shorter than beam displacer 410 which is similarly a unit shorter than beam displacer 415. The "heights" of the displacers may be necessarily determined in order to accommodate the increasing number of beams propagating through the system or reduced in order to minimize the total volume of optical elements.

The arrangement disclosed herein and illustrated, for example, in FIG. 4A is operable with incident electromagnetic radiation such as infrared light of around 1 micron wavelength, which significantly increases the diffraction rate suffered by the beam over the values for visible wavelengths. However, the beam is composed of a row, or rows, of Gaussian beamlets that propagate independently. Since a Gaussian beam undergoes the least diffraction of any beam profile, the resulting beamlet stack also propagates with minimal diffraction. By comparison, prior art refractively-reshaped flat-top beams inherently suffer diffraction effects which cause the profile to change significantly in less than 0.5 meters. Under these conditions the useable range of prior art is reduced to around 250 mm. By contrast, profiles created using the arrangement disclosed herein suffer much less degradation in uniformity, even at distances up to several meters.

Figure 6:
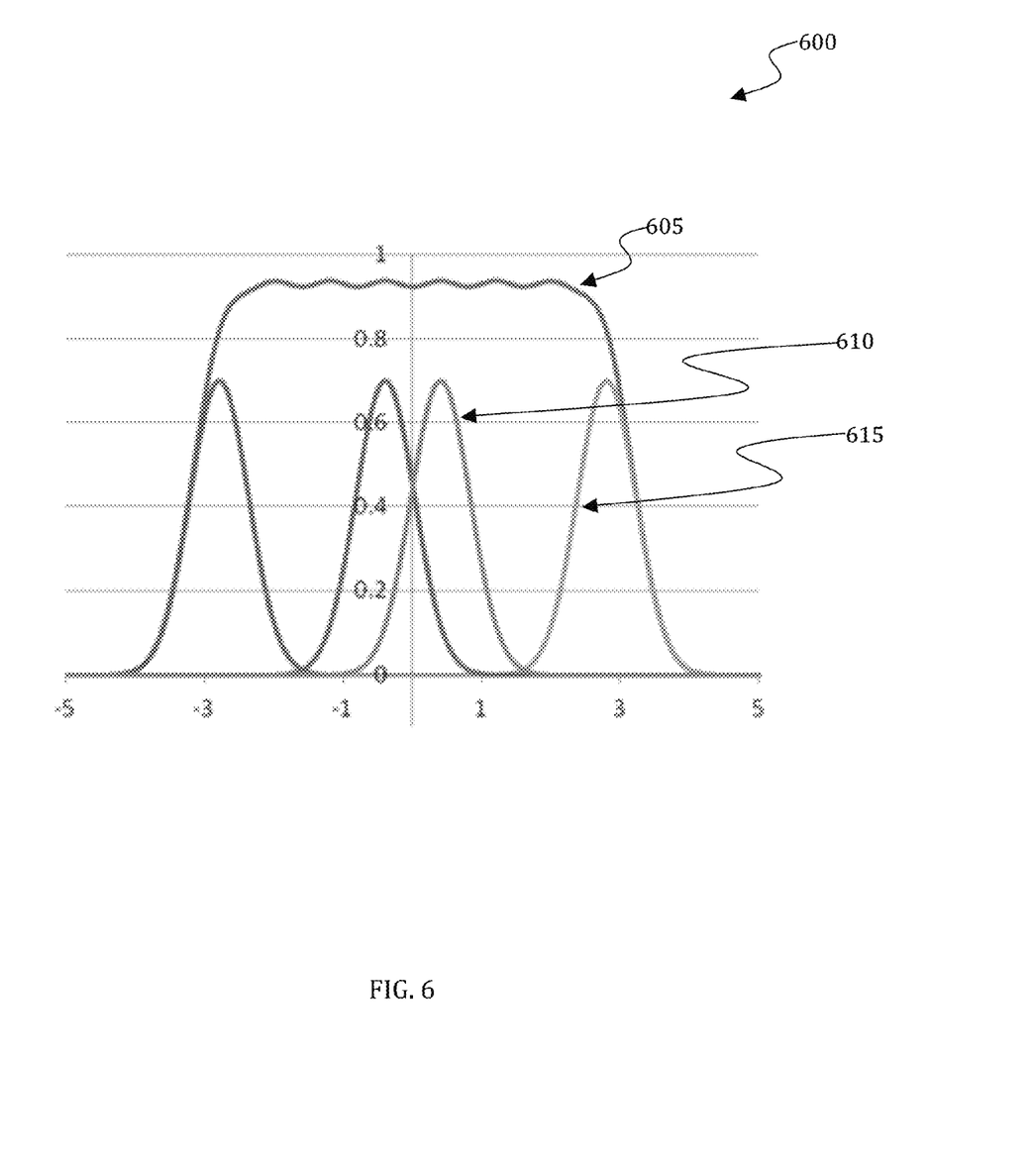
FIG. 6 depicts a chart illustrating the sum of multiple beamlets producing an intensity profile in accordance with another embodiment of the invention.

Furthermore, the arrangement illustrated in, for example, FIG. 4A creates a flat, or other shaped, beam composed of a row or rows of Gaussian beamlets, which propagate independently. FIG. 6 illustrates a chart 600. As illustrated by this chart, summing of the eight constituent. Gaussian beamlets 610 and 615 can create the "top hat" flat intensity profile 605.

Alignment of the optical elements in FIG. 4A is noncritical. Beam angles transverse to the stacking axis do produce small transverse offsets between the displaced trajectories, but the effect is only significant if the angle is large. Angular errors parallel to the stacking axis have little measureable effect. Offsets in beam position in either axis have no effect until the aperture limit is reached. Thus, the present configuration does not require extreme angular tolerances and offsets, or a 4-axis adjustment stage as is common in the prior art.

The displacers 405, 410, and 415 further illustrate that in one embodiment the dimensions of the birefringent crystals (i.e., beam displacers) can be tailored to reduce the amount of birefringent material required. In FIG. 4A, the dimension of the crystals transverse to the stacking axis could be reduced to at least twice the full width of an expected Gaussian input beam, and the dimension along the stacking axis could be reduced so as to only be sufficient to pass the size of the stacked beam at each stage. The configuration illustrated in FIG. 4 requires only 34% of the volume of birefringent crystal material compared to standard 10 mm cross-section crystals. Eliminating unnecessary volume of birefringent material can significantly reduce the cost of the embodiments disclosed herein. It should be appreciated that other sizes can similarly be employed.

Figure 5:
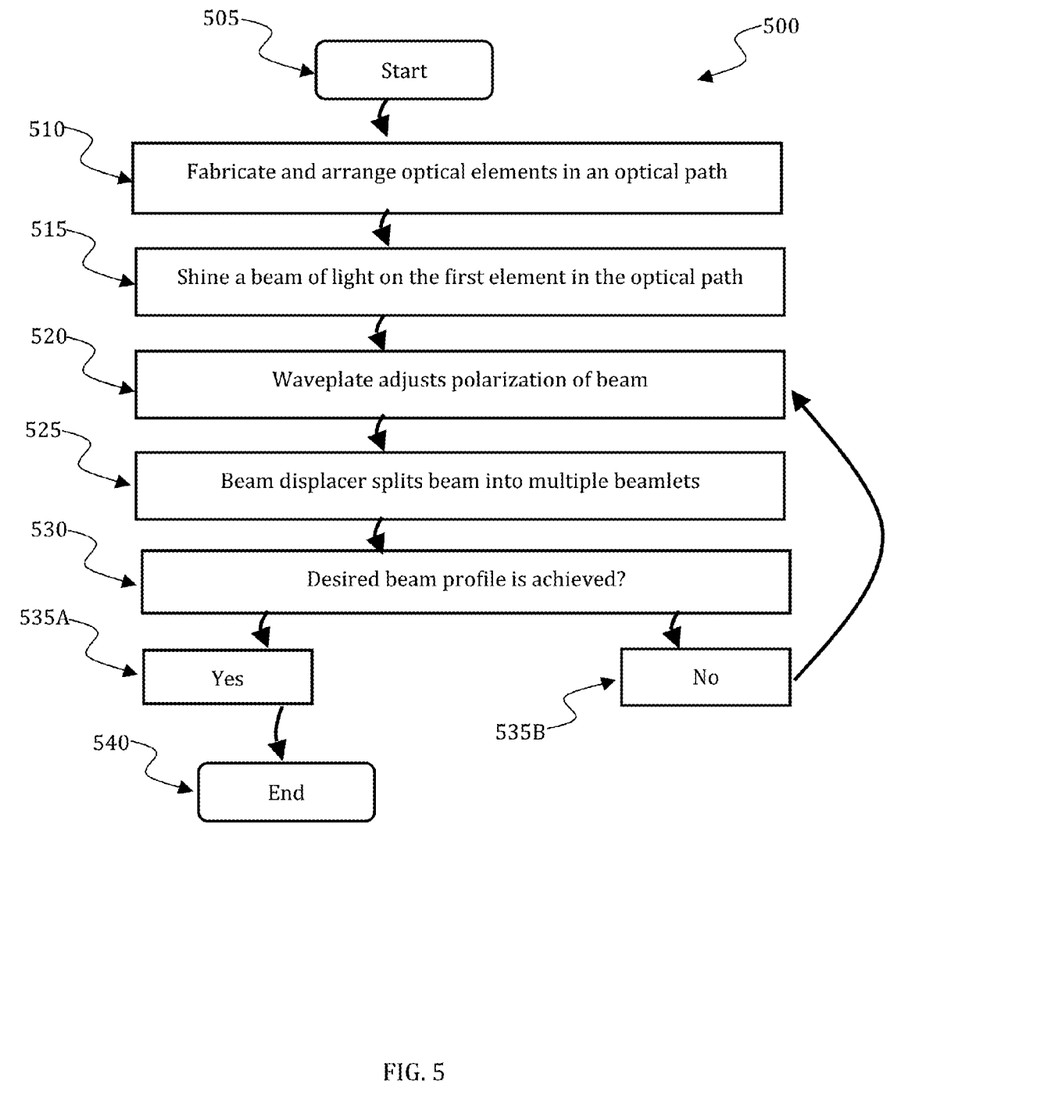
FIG. 5 depicts logical operational steps associated with a method for shaping an intensity profile of electromagnetic radiation in accordance with another embodiment of the invention.

FIG. 5 illustrates steps associated with a method 500 to create a desired beam profile, in accordance with an example embodiment. The method 500 begins as depicted at step 505. As shown at step 510, the optical elements associated with the method, such as those shown in FIG. 1 above, can be fabricated and arranged. The configuration uses a series of birefringent beam displacers whose lengths are related by, for example, factors of two for example, 40 mm, 20 mm, 10 mm, etc.), Each stage is preceded by a retardation plate which rotates the polarization of the emerging S and P polarized beams to a multiple of 45 degrees (or alternatively, into a circularly polarized state) allowing that stage to split each incoming beam again. A set of N such stages of wave plates and displacers result in a row or stack of 2^N beamlets.

Once the optical path has been arranged, as depicted at step 515, a laser or other such device is used to direct a beam of light on the first element in the optical path. This may be, for example, a wave plate or beam displacer. As shown at step 520, a wave plate can be used to adjust the polarization of the incident beam before the beam is split as indicated at step 525. A beam that is incident on the beam displacer is caused to split into two (or more) orthogonally polarized beams, one of which deviates from its original trajectory. The angle at which it deviates may be approximately 4 degrees or other such angle depending on the arrangement. Since the lengths and therefore the displacements of each stage differ by a factor of 2, each split produces a new set of beams which propagate between the paths of the undisplaced beams.

If the exiting beamlets create the desired beam profile as indicated at step 530 as illustrated by step 535A, the method ends as shown thereafter at step 540. Alternatively, if further beam manipulation is required to achieve the desired beam profile as indicated at step 530 as illustrated by step 535B, the beam is then subjected to further polarization adjustment and displacement. Any number of wave plates and beam splitters may be necessary before the desired profile is achieved. The two or more separated beams then exit the respective crystal such that the resulting plurality of split beams is shaped in a desired intensity profile.

Thus, a beam-shaping device can be used with a series of birefringent displacer crystals which have lengths related by factors of two. In one embodiment, the arrangement can be used for monochromatic light. This allows each successive set of transversely split beams to occupy the space between the previous set, resulting in a row or stack of closely spaced beams whose individual profiles overlap. The output is then a composite beam with a desired intensity profile in one axis and the original Gaussian profile in the other axis. Additionally, the displacer stages may be used to produce splits out of the plane of those from other stages allowing formation of two-dimensional profiles. The output can comprise an array of closely spaced overlapping Gaussian beams which can propagate at least 1 meter with minimal changes in shape or density due to the diffraction effects which otherwise rapidly degrade the profiles of flat beams formed by other means. A closely spaced stack of overlapping Gaussian beams may also be produced wherein adjacent beams are orthogonally polarized, largely eliminating interference effects within the stacked beam.

Based on the foregoing, it can be appreciated that a number of embodiments, preferred and alternative, are disclosed herein. For example, in one embodiment, a system for shaping a beam comprises an emitter emitting coherent electromagnetic radiation; and at least two birefringent displacers configured between the emitter and a target wherein the at least two birefringent displacers split the coherent electromagnetic radiation into a plurality of coherent parallel beams of electromagnetic radiation thereby producing a shaped wave front of the coherent parallel beams of electromagnetic radiation.

In another embodiment, the system comprises at least one wave plate configured in front of each of the at least two birefringent displacers, wherein the at least one wave plate is at least one of a half wave plate and a quarter wave plate. The at least two birefringent displacers decreases in a binary progression.

In yet another embodiment, the at least one wave plate may be rotated to vary the plurality of coherent parallel beams of electromagnetic radiation emerging from each of the at least two birefringent displacers, thereby altering the shape of the wave front of the coherent beam of electromagnetic radiation. The shape of the wave front of the coherent beam of electromagnetic radiation comprises one of a rooftop shape; a profile wherein the central 50% of the profile's extent has a greater intensity than adjacent ends of the profile; a profile wherein the central 50% of the profile's extent has a lesser intensity than adjacent ends of the profile; a stair-step profile which increases approaching the center of the profile and then reaches the original intensity at the other end; and a stair-step profile which decreases approaching the center of the profile and then reaches the original intensity at the other end. In one embodiment, the at least two birefringent displacers comprise three birefringent displacers.

In another embodiment, a method for shaping a beam comprises emitting coherent electromagnetic radiation with an emitter; and splitting the coherent electromagnetic radiation into a plurality of coherent parallel beams of electromagnetic radiation with at least two birefringent displacers configured between the emitter and a target thereby producing a shaped wave front of the coherent parallel beams of electromagnetic radiation. The method further comprises rotating the coherent electromagnetic radiation using at least one wave plate configured in front of each of the at least two birefringent displacers.

In another embodiment, the at least one wave plate is at least one of a half wave plate and a quarter wave plate. The method comprises decreasing a length of the at least two birefringent displacers in a binary progression.

In another embodiment, the method further comprises rotating the at least one wave plate to vary the plurality of coherent parallel beams of electromagnetic radiation emerging from each of the at least two birefringent displacers, thereby altering the shape of the wave front of the coherent beam of electromagnetic radiation.

In another embodiment, the shape of the wave front of the coherent beam of electromagnetic radiation comprises one of a rooftop shape; a profile wherein the central 50% of the profile's extent has a greater intensity than adjacent ends of the profile; a profile wherein the central 50% of the profile's extent has a lesser intensity than adjacent ends of the profile; a stair-step profile which increases approaching the center of the profile and then reaches the original intensity at the other end; and a stair-step profile which decreases approaching the center of the profile and then reaches the original intensity at the other end. The at least two birefringent displacers comprise three birefringent displacers.

In another embodiment, a system for shaping a beam comprises an emitter emitting coherent electromagnetic radiation; at least two birefringent displacers configured between the emitter and a target wherein the at least two birefringent displacers split the coherent electromagnetic radiation into a plurality of coherent parallel beams of electromagnetic radiation; and at least one wave plate configured in front of each of the at least two birefringent displacers, thereby producing a shaped wave front of the coherent parallel beams of electromagnetic radiation. The at least one wave plate is at least one of a half wave plate and a quarter wave plate.

In another embodiment, the length of the at least two birefringent displacers decreases in a binary progression. The at least one wave plate may be rotated to vary the plurality of coherent parallel beams of electromagnetic radiation emerging from each of the at least two birefringent displacers, thereby altering the shape of the wave front of the coherent beam of electromagnetic radiation.

In another embodiment, the shape of the wave front of the coherent beam of electromagnetic radiation comprises one of a rooftop shape; a profile wherein the central 50% of the profile's extent has a greater intensity than adjacent ends of the profile; a profile wherein the central 50% of the profile's extent has a lesser intensity than adjacent ends of the profile; a stair-step profile which increases approaching the center of the profile and then reaches the original intensity at the other end; and a stair-step profile which decreases approaching the center of the profile and then reaches the original intensity at the other end. The coherent electromagnetic radiation comprises a laser beam.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A system for shaping a beam comprising:
    an emitter emitting spatially coherent electromagnetic radiation;
    at least two birefringent displacers configured between said emitter and a target in at least two stages wherein said stages define a fixed distance, wherein said at least two birefringent displacers further comprise a parallel input and output face with an optical axis at 45 degrees thereof configured to split said coherent electromagnetic radiation into a plurality of coherent parallel beams of electromagnetic radiation thereby producing a shaped wave front of said coherent parallel beams of electromagnetic radiation; and at least one wave plate configured in front of each of said at least two birefringent displacers.

2. The system of claim 1 wherein said at least one wave plate is at least one of:
a half wave plate; and
a quarter wave plate.

3. The system of claim 1 wherein a length of said at least two birefringent displacers decreases in a binary progression.

4. The system of claim 3 wherein said at least one wave plate may be rotated to vary said plurality of coherent parallel beams of electromagnetic radiation emerging from each of said at least two birefringent displacers, thereby altering said shape of said wave front of said coherent beam of electromagnetic radiation.

5. The system of claim 4 wherein said shape of said wave front of said coherent beam of electromagnetic radiation comprises one of:
a profile wherein the central 50% of said profile's extent has a greater intensity than adjacent ends of said profile;
a stair-step profile which increases approaching the center of said profile and then reaches the original intensity at the other end; and
a stair-step profile which decreases approaching the center of said profile and then reaches the original intensity at the other end.

6. The system of claim 1 wherein said at least two birefringent displacers comprise three birefringent displacers.

7. A method for shaping a beam comprising:
emitting spatially coherent electromagnetic radiation with an emitter;
splitting said coherent electromagnetic radiation into a plurality of coherent parallel beams of electromagnetic radiation with at least two birefringent displacers further comprising a parallel input and output face with an optical axis at 45 degrees thereof configured between said emitter and a target in at least two stages wherein said stages define a fixed distance, thereby producing a shaped wave front of said coherent parallel beams of electromagnetic radiation; and
rotating the coherent electromagnetic radiation using at least one wave plate configured in front of each of said at least two birefringent displacers.

8. The method of claim 7 wherein said at least one wave plate is at least one of:
a half wave plate; and
a quarter wave plate.

9. The method of claim 7 further comprising: decreasing a length said at least two birefringent displacers in a binary progression.

10. The method of claim 9 further comprising:
rotating said at least one wave plate to vary said plurality of coherent parallel beams of electromagnetic radiation emerging from each of said at least two birefringent displacers, thereby altering said shape of said wave front of said coherent beam of electromagnetic radiation.

11. The method of claim 10 wherein said shape of said wave front of said coherent beam of electromagnetic radiation comprises one of:
a profile wherein the central 50% of said profile's extent has a greater intensity than adjacent ends of said profile;
a stair-step profile which increases approaching the center of said profile and then reaches the original intensity at the other end; and
a stair-step profile which decreases approaching the center of said profile and then reaches the original intensity at the other end.

12. The method of claim 7 wherein said at least two birefringent displacers comprise three birefringent displacers.

13. A system for shaping a beam comprising:
an emitter emitting spatially coherent electromagnetic radiation;
at least two birefringent displacers configured between said emitter and a target in at least two stages wherein said stages define a fixed distance, wherein said at least two birefringent displacers further comprise a parallel input and output face with an optical axis at 45 degrees thereof configured to split said coherent electromagnetic radiation into a plurality of coherent parallel beams of electromagnetic radiation; and
at least one wave plate configured in front of each of said at least two birefringent displacers, thereby producing a shaped wave front of said coherent parallel beams of electromagnetic radiation.

14. The system of claim 13 wherein said at least one wave plate is at least one of:
a half wave plate; and
a quarter wave plate.

15. The system of claim 14 wherein a length said at least two birefringent displacers decreases in a binary progression.

16. The system of claim 15 wherein said at least one wave plate may be rotated to vary said plurality of coherent parallel beams of electromagnetic radiation emerging from each of said at least two birefringent displacers, thereby altering said shape of said wave front of said coherent beam of electromagnetic radiation.

17. The system of claim 16 wherein said shape of said wave front of said coherent beam of electromagnetic radiation comprises one of:
a profile wherein the central 50% of said profile's extent has a greater intensity than adjacent ends of said profile;
a stair-step profile which increases approaching the center of said profile and then reaches the original intensity at the other end; and
a stair-step profile which decreases approaching the center of said profile and then reaches the original intensity at the other end.

18. The system of claim 17 wherein said coherent electromagnetic radiation comprises a laser beam.

* * * * *